F. BEDFORD.
REDUCTION OF ORGANIC SUBSTANCES.
APPLICATION FILED JUNE 17, 1909.
949,954.
Patented Feb. 22, 1910.
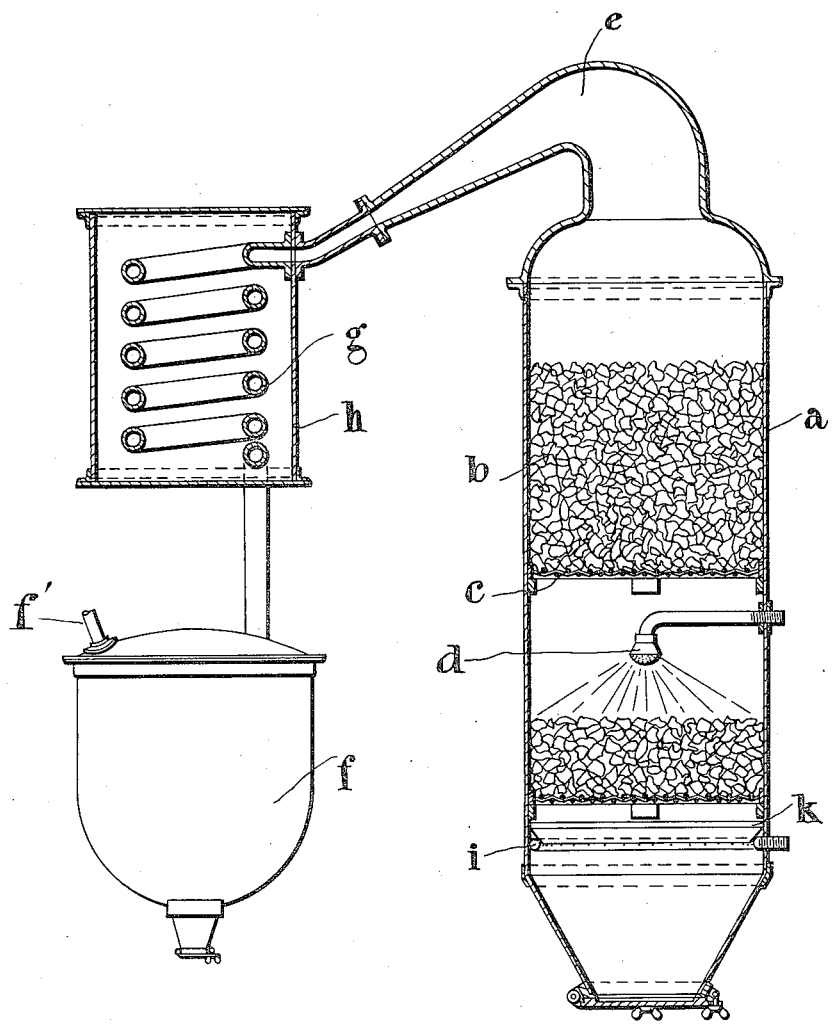

UNITED STATES PATENT OFFICE.

FRED BEDFORD, OF SLEAFORD, ENGLAND, ASSIGNOR OF ONE-HALF TO CHARLES EDWARD WILLIAMS, OF SLEAFORD, ENGLAND.

REDUCTION OF ORGANIC SUBSTANCES.

949,954.

Specification of Letters Patent.     Patented Feb. 22, 1910.

Application filed June 17, 1909. Serial No. 502,740.

*To all whom it may concern:*

Be it known that I, FRED BEDFORD, Ph. D. B. Sc., London, a subject of the King of Great Britain and Ireland, and residing at Sleaford, in the county of Lincoln, England, have invented certain new and useful Improvements in and Relating to the Reduction of Organic Substances, of which the following is a specification.

This invention relates to the reduction of organic substances such as organic unsaturated fluids and solids by converting them into saturated compounds, for instance, the conversion of unsaturated fatty acids or their esters into saturated acids or their esters, respectively, or the reduction of nitro-bodies, such as for instance, nitro-benzole and ketones, for example benzo-phenone.

The invention has special reference to the process described in patent application Serial No. 409518 the object of the present invention being to increase the yield of reduced substance and to insure a thorough bleaching of the latter.

According to the present invention the tower or vessel in which the reduction occurs is placed under vacuum or connected with a suitable vacuum chamber.

The accompanying diagram illustrates in section one form of apparatus which may be employed.

In carrying out the invention according to one mode a tower, $a$, is partly filled with nickel coated pumice stone, $b$, prepared for instance, in the manner described in the before mentioned specification and forming a porous mass and supported on grids $c$. When nickel, for example, is used as a catalytic substance, it is deposited on its support by reduction from its nitrate. The substance which is to form the support for the nickel may be fragments of pumice stone, porous earthenware or the like, and it is placed in the solution and allowed to stand for some time, after which the excess solution is drawn off or the nitrate solution is allowed to flow on to the support in vacuum. The pumice stone or other support is then heated over a fire in a crucible to convert the nitrate into oxid. If the layer is too thin, the operation of soaking in nitrate solution and heating must be repeated. Finally, it is introduced into a suitable receptacle or tower and heated to, say, from 275° to 300° C. in a current of hydrogen with or without the addition of ether or other organic vapor (which does not destroy the catalytic properties of the nickel), to convert the nickel oxid into nickel, and as soon as reduction is complete, the contents are allowed to cool to the temperature at which the reduction is to take place, e. g. for oleic acid and oils 160° to 200° C. This material is placed in the tower as illustrated in the drawings at $b$. At a suitable point, somewhat near the bottom of this tower, the substance to be reduced is introduced in a form of spray, for instance, it is preferably sprayed in a liquid form by means of hydrogen, the spray nozzle, rose, or other device, $d$, being connected with a vessel containing the substance in a liquid form which is forced out of the vessel by means of hydrogen under pressure and upon a mass of catalytic material supported on grids similar to that in the upper part of the tower, $a$ the tower. The upper part of the tower, $a$ is connected by a pipe or conduit, $e$, to a receiving vessel, $f$, in which a partial vacuum is maintained by means of a vacuum pump.

A cooler such as a coil, $g$, in a water tank, $h$, is preferably interposed between the receiver $f$ and the tower $a$. The connection from the vacuum pump to the vacuum or receiving vessel $f$ is adapted to prevent as much as possible the passage of reduced substance to the pump, traps or any other devices being interposed for this purpose.

The receiver is provided with a pipe indicated at $f'$, which leads to a vacuum pump of any suitable or well known kind.

Hydrogen is introduced through a perforated ring, $i$, or the like at the bottom part of the tower, $a$, below the lower grid a shield, $k$, being provided if required to prevent choking of the holes in the ring $i$, should the apparatus be allowed to stand.

As an example illustrating the application of the process to a specific raw material the conversion of commercial oleic acid as obtained from cotton oil to a stearic acid may be described as follows:—The oleic acid is first subjected to a preliminary purification by any well known method such as by distillation. It is then sprayed in through the nozzle, $d$, by means of hydrogen under a pressure above that of the atmosphere. The liquid oleic acid is preferably at a temperature of about 200° C. and a diminished pressure of about 50 to 100 millimeters is maintained within the tower, $a$, by a vacuum pump as above described. The sprayed liquid acid coming into contact with the catalytic substance is for the greater part reduced, vaporizes and passes upwardly through a further mass of catalytic substance and thence through the cooling coil, $g$, which is maintained at a temperature of about 180° C. so as to prevent solidification and enable the stearic acid to be drawn off through the receiver, $f$. The catalytic substance in the tower may be maintained at a temperature of about 200° C. in any well known manner, for instance by surrounding the tower, $a$, by an oil bath.

It is found in practice that according to this improved method or process not only is the yield of reduced substance greatly increased, but that the substance is more thoroughly bleached than when a process of reduction is carried on at or above atmospheric pressure. By connecting the tower to the vacuum chamber the substance to be reduced when it is sprayed upon the nickel coated compound or other catalytic substance and simultaneously meets the hydrogen introduced in any suitable manner, is not only reduced as described in the before mentioned specification but vaporizes and being dispersed as a vapor throughout the tower comes into contact with the catalytic substance and hydrogen therein and passes off to the vacuum chamber or receiver. The tendency for the reduced substance to remain upon the catalytic substance and thereby to decrease the available effective area, is avoided, so that the yield from a certain plant per unit of time is greatly increased.

The best results are obtained by first spraying the substance to be reduced on to the catalytic substance at the ordinary pressure, for instance at or about atmospheric pressure, and when a certain quantity has been sprayed, putting the apparatus at the same temperature, under vacuum and drawing off the reduced substance. When no more substance collects in the receiver, more substance is sprayed on to the catalytic substance and so on.

It is obvious that several towers or reducing plants can be connected up to one common vacuum or receiving chamber.

The invention is not confined to the use of any particular form of tower or reducing chamber, so long as it is capable of carrying out the process described and is also capable of being placed under vacuum or low pressure.

Having now described my invention, what I claim as new and desire to secure by Letters Patent is:—

1. A process for reducing liquid organic substances, consisting in drawing said substances in a finely divided form and in the presence of hydrogen, through a porous mass of catalytic material, into a receiver in which a partial vacuum is maintained.

2. A process for reducing liquid organic substances, consisting in drawing said substances in a finely divided form and in the presence of hydrogen, through a porous mass of catalytic material and through a cooling coil, into a receiver in which a partial vacuum is maintained.

In testimony whereof, I affix my signature in presence of two witnesses.

FRED BEDFORD.

Witnesses:
A. W. MATHYS,
P. A. OUTHWAITE.